Inventor
Jacques Muller
By
Mc Conkey + Smith
Attorneys

Patented Jan. 13, 1948

2,434,426

UNITED STATES PATENT OFFICE 2,434,426

COUPLING

Jacques Muller, La Garenne-Colombes, France

Application March 9, 1938, Serial No. 194,919
In France March 20, 1937

Section 3, Public Law 690, August 8, 1946
Patent expires March 20, 1957

3 Claims. (Cl. 285—169)

The present invention relates to means for the connecting or coupling of conduits, pipes and so forth and is also applicable to the connection of lubricant guns to fittings to be lubricated, as well as to the coupling of a nozzle to an obturator for the filling and emptying of reservoirs.

One object of the invention is to provide a fluid tight coupling which is easily and quickly assembled and disassembled. Heretofore it was known in the filling of tanks and reservoirs to provide an obturator on the tank with which obturator a nozzle was adapted to be assembled, the nozzle being held in filling position on the obturator by means of jaws operated by an element on the nozzle which jaws penetrated into a depression or throat in a wall of the obturator.

A further object of the present invention is to replace the heretofore known jaws of the nozzle by spring means adapted to be urged into the depression or throat of the obturator and thus maintain the obturator and nozzle assembled in operative relation.

Another object of the invention is to improve the operation of assembling a joint of the nature described by the provision of means whereby the joint is first closed and then tightened.

Still another object of the invention is to provide clamping means of the type described wherein the spring means operates to urge both elements of the joint into operative engagement with respect to each other.

A further object of the invention is to provide in connection with the joint of the type disclosed one or several hydraulic seals to preclude the leakage of fluid from the joint.

In certain devices of this kind heretofore provided, means were foreseen to preclude the disassembly or disconnection of the nozzle whilst the valve controlling the flow of fluid through the nozzle was open. However, in the devices provided heretofore, it was possible, after uncoupling or disconnecting the nozzle, to open the said valve and empty out the liquid or fluid contained in the hose connection between the nozzle and the source of supply.

A further object of the present invention is to preclude opening of the valve controlling the flow through the nozzle until the fluid within the nozzle is subjected to pressure thus preventing the emptying of the hose connection after separation of the nozzle from the obturator.

A further object of the invention is to provide means adapted to be subjected to the pressure of the fluid within the nozzle to lock the valve in closed position when the pressure is cut off and to permit opening of the valve only when the pressure within the nozzle is again restored.

Further objects and characteristics of the invention will appear as the description thereof proceeds, for a complete understanding of which reference should be had to the accompanying drawings wherein.

Figure 1:
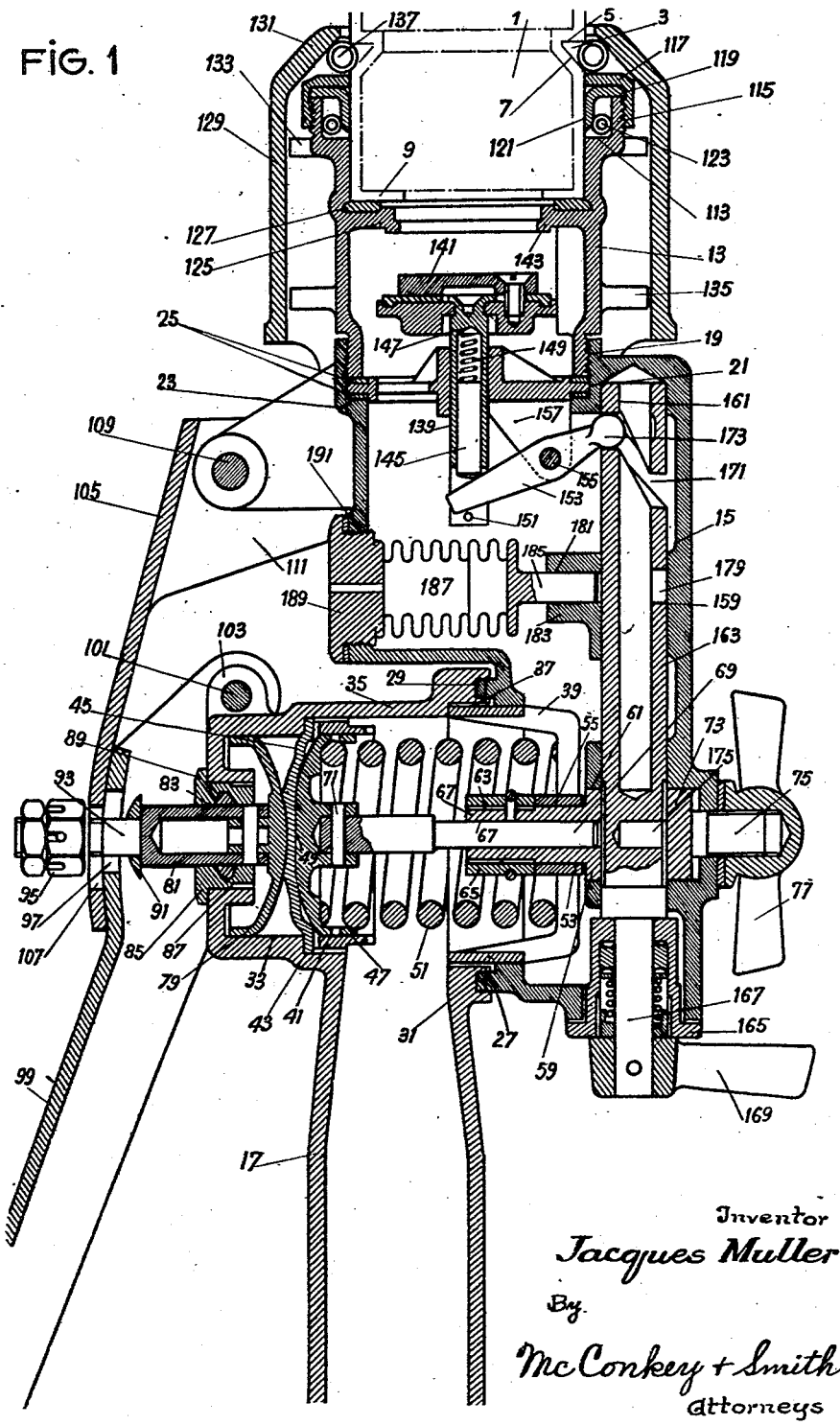
Figure 1 is a section in elevation of an obturator and filling nozzle.

Referring to Figure 1, there is shown an obturator 1 adapted, as is well known, to be fixedly applied to the top, side or bottom of a reservoir or tank to be filled so as to be permanently carried by the reservoir or tank. The obturator incorporates a depression or throat 3, the upper edge 5 of which is transverse to the axis of the obturator and the lower edge 7 of which is inclined to the axis of the obturator, for a purpose which will hereinafter appear. The lower portion of the obturator is flanged inwardly as at 9, to provide a seal for the end of a nozzle which is adapted to be applied to the obturator.

The nozzle, generally designated 11, may be constructed of three cast sections 13, 15 and 17, the latter of which is adapted to communicate with a hose connection (not shown) leading to a source of fluid or liquid. The mid section 15 of the nozzle is screw-threaded at 19 for the reception of the upper section 12 adapted to be screw-threaded thereon. A spider 21 is disposed on an offset 23 formed in the mid section 15, and is held assembled against the offset by screwing up the upper section 13 unto the mid section 21. Suitable sealing means of any desired nature such as rubber or fiber washers 25 are inserted at each side of the spider.

The mid section 15 is provided with an annular laterally extending flange 27, adapted to be received within a corresponding depression 29 formed in the lower section 17. Suitable sealing means are provided as at 31. The arrangement is such as to permit the lower and mid sections 17 and 15 to be rotated with respect to each other about an axis passing through the axis of the flange 27.

Section 17 is provided with bores 33, 35 and 37, of different diameters. Bore 37 is adapted to screw-threadedly receive a spider 39 for a purpose which will hereinafter appear. Bore 35 is adapted to receive a bushing 41 between which and a shoulder 43 formed between bores 33 and 35, a diaphragm 45 is adapted to be clamped. Slidably disposed within the bushing 41, is a piston 47 having a convex face 49, the piston being urged towards the diaphragm 45 by a spring 51, one end of which abuts against the piston 47 and the other end against the spider 39.

The spider 39 is provided with a flange 53, bored out as at 55, to receive a sleeve 57, having a flanged end 59 engaging the spider 55, in turn positioned within a bore 61 provided in the mid section 18. The sleeve is provided with a section of smaller diameter 63 on which is slipped a second sleeve 65 adapted to be pinned or fixed in any desired manner to the sleeve 57. The sleeve 57 is formed with a central bore 67 in which a rod 69 connected to the piston 47, as by pin 71, is adapted to slide. The bore 61 in the mid section 15 is also provided with a shoe 73 slidable therein a screw 75 and wing nut 77 being adapted to displace the shoe 73 to the right or to the left for a purpose which will hereinafter appear.

Within bore 33 of the section 17, is provided a piston 79 having a convex face between which and piston 41 the diaphragm 45 is disposed. Piston 79 is fitted with a rod 81 extending through a bore 83 in a bushing 85 disposed within a bore 87 of a wall of the section 17. Suitable sealing means such as seal 89 is provided between the bushing 85 and the rod 81. The rod 81 is provided with an enlarged head 91 from which extends a pin 93 having a threaded end for the reception of a lock nut 95. The pin 93 passes through, with considerable play, an opening 97 in a lever member 99, pivoted at 101 in a boss 103 formed on the lower section 17. A lever member 105, having an opening 107 therein through which pin 93 passes loosely, is held by the lock nut 95 in abutting relation with respect to lever 99, the arrangement being such however that a certain sliding of the lever 99 with respect to the lever member 105 is permitted. Lever member is pivoted at 109 on the mid section 15, and provided with an extending arm 111, for a purpose which will hereinafter appear.

The upper end of the section 12 is provided with an annular offset 113 and a threaded flange 115. Between the flange 115 and a cap 117, adapted to be threaded thereon, is clamped a seal 119, a portion 121 of which is adapted to extend into contact with a wall of the obturator when the nozzle is assembled thereon. An annular spring 123 is provided to urge the washer into closer contact with the wall of the obturator. The section 13 is further provided with an annular internal flange 125 forming a seat for the washer 127 or other suitable seal adapted, when the nozzle is assembled on the obturator, to be urged into tight contact with the internally flanged base 9 of the obturator.

A sleeve 129 encompassing the upper section 13 of the nozzle and formed with an inwardly inclined cam-like portion 131 is centered upon the section 13 by pins 133—135 or any centering means found appropriate. The sleeve 129 is adapted to be reciprocated axially with respect to the section 13 and for this purpose the sleeve is connected by any means found suitable (not shown) to arm 111 of the lever 105. An annular spring 137 having an internal diameter normally greater than the diameter of the obturator 1 is held within the sleeve 129 by means of the cap 117 and the cam portion 131 of the sleeve.

It will be obvious that when the nozzle is assembled on the obturator, on displacement of the sleeve 129 upwardly (Fig. 3), the annular spring 137 is permitted to expand whilst on displacement of the sleeve 129 downwardly (Fig. 2), the annular spring 137 is urged by the inclined surface 131 into the throat or depression provided in the obturator to hold the obturator and nozzle is fixed relation with respect to each other.

Within a bore provided therefor in the spider 21, is positioned for sliding movement therein a hollow rod 139 on the upper end of which is mounted in any desired manner a valve 141 adapted to cooperate with a seat 143 formed on the flange 125, so as to control the flow of fluid through the nozzle. A pin 145 is positioned within the hollow rod 139 and between the base of the hollow 147 and the pin 145 is disposed a spring 149 which acts as a cushion on closing the valve. The rod 139 carries a transverse pin 151 between which and the lower end of the pin 145, engages the end of a lever 153 pivoted at 155 on a stirrup 157 carried by the mid section 15.

Within the mid section 15 and eccentrically thereof is provided a bore 159. Extending through the bore 159 and seated on a bearing 161, formed in the end thereof is the valve operating shaft 163. The shaft 163 is held within the bore by a threaded bushing 165, threaded into the base of the bore and through which a portion of the shaft 167 of reduced section passes. A handle 169 is connected to the reduced portion of the shaft 167 in any desired manner permits the rotation of the shaft in the bore. It is to be noted that the bore 159 is intersected by the axes of the piston rod 69 and that the shoe 73 may be moved into engagement with the shaft 163 to clamp the latter in one position and may be moved away from the shaft in order to release it for rotation by the handle 169. The shaft 163 adjacent the lever 153 is formed with an helical groove 171 in which is positioned a rounded head 173 provided on the lever 153. It will be obvious that on rotation of the shaft 159, the helical groove will effect operation of the lever 153 and thus closing or opening of the valve 141. Provided in the base of the shaft 163 and co-axial with the piston rod 69 is a bore 175. When the shaft 163 is turned into the position corresponding to closure of the valve 141, the bore 175 is positioned opposite to the piston rod 169, so that displacement of the piston rod 169 to the right will cause it to engage within the bore 177 and thus lock the shaft 163 in position.

Intermediate its ends, there is provided in the shaft 163 a further transverse bore 179. Adjacent the bore 179 and slidably engaged in a bore 181 formed in a boss 183 on the mid section 15, is a pin 185. The pin is carried by a spring bellows-like organ 187 that is positioned within the section 15 and adapted to be subjected to the pressure of the fluid existing therein or passing therethrough. The bellows 187 may be conveniently carried by a plug 189 which may be threadedly received in an opening 191, provided in the mid section 15. It will be evident that when the valve actuating shaft 163 is turned to the position corresponding to valve 141 closed, that the pin 185 will be co-axial with the bore 179 formed in the shaft 163. At this time, if the pressure on the fluid within the nozzle is cut off the bellows member 187 will expand and thrust the pin 185 into bore 179, thus locking the valve actuating shaft 163 in position with the valve 141 closed.

Figure 3:
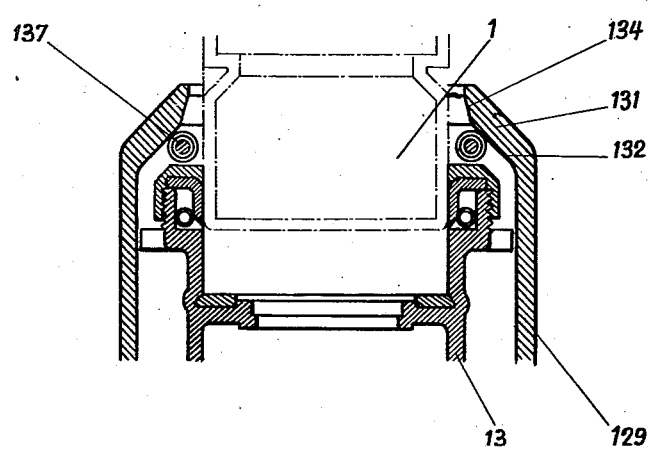
Figure 3 shows the mechanism of Figure 2 in released position.

The operation of the device is briefly as follows:

In order to clamp the nozzle to the obturator of a reservoir to be filled, lever 99 must be moved inwardly, against the pressure of spring 51, toward the section 17 in order to raise the sleeve 129 and thus permit the spring 137 to expand. Subsequently, the nozzle is adjusted into position on the obturator as shown in Figure 3 and thereon the lever 99 is released and the spring 51 urges it outwardly to lower the sleeve 129. This results in forcing the spring, through the intermediary of the cam portion 131, into the groove or throat 3 and thus clamps the obturator and nozzle in assembled relation.

Assuming that the nozzle is clamped in position on the obturator and that the valve 141 is closed, it will be seen from Figure 1 that only when the valve is closed may the lever 99 be operated against the pressure of spring 51 to raise the sleeve 133 and thus release the spring 137 from clamping position. Since the bore 175 in the valve operating shaft 163 is only concentric with the pin 169 of the piston 41 when the valve is in closed position, it will be obvious that it is only when the valve is in closed position that lever 99 may be moved towards the section 17 to raise the sleeve 129. During this operation, piston 47 is moved to the right against pressure of spring 51 and the piston rod 69 moves into the depression 175 in the valve operating shaft 163. It should be noted that when the valve is in closed position and the pressure to the nozzle is cut off, the bellows 187 is permitted to expand and thus forces the rod 185 into the bore 179 in the valve operating rod 163, thus blocking the valve in closed position.

Such an arrangement, as will be obvious, precludes an operator from separating the nozzle from the obturator when the valve is open and further precludes him, after the removal of the nozzle from the obturator, from emptying out the liquid contained in the hose connection by which the nozzle is connected to the source of supply. Thus such an arrangement precludes therefore unauthorized emptying of the hose and assures that the proper measure of liquid will be forced into the tank.

Figure 2:
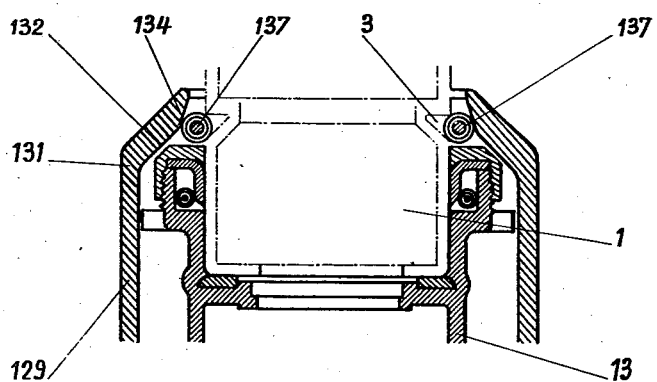
Figure 2 is a section of a modified form of clamping mechanism illustrated in clamped position.

Referring to Figures 2 and 3, wherein corresponding reference numerals indicate the same elements as in Figure 1, it is to be noted that the formation of the cam surface 131 has been modified. In Figures 2 and 3 this surface, instead of consisting of a plane incline, comprises cam surfaces 132, 134. With this formation of the cam surfaces, it will be apparent that on lowering of the sleeve 129, the spring 137 will first be engaged by the cam surface 132 which surface by the way cuts the axes of the nozzle with a greater angle than does the surface 134. Consequently, the surface 132 operates to compress the spring 137 rapidly and urge it into the throat or depression No. 3. Subsequently, on further lowering of the sleeve 129, the surface 134 of lesser angle, operates to tighten the spring in the throat or depression. In this connection, it should be noted that in clamped position of the nozzle on the nipple, the force of the spring 137 opposing its compression, has a component parallel to the axis of the nozzle and nipple operative to urge the nozzle and nipple towards each other to compress the seal at 127.

Figure 4:
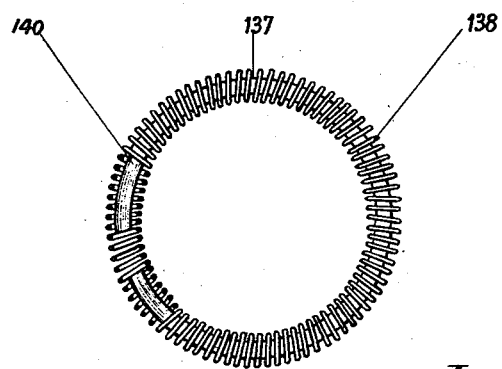
Figure 4 is a spring adapted to be utilized with the clamping mechanism illustrated.

Referring to Figure 4 there is illustrated a type of spring 137 which has shown itself particularly effective. This spring comprises an annular spiral spring 138 within the interior of which is disposed a split spring ring 140, the split in the spring ring 140 being sufficiently large to permit considerable compression of the coil spring 138. This split spring ring operates to preclude deformation of the coil spring 138 out of the normal plane of the spring but permits contraction of the coil spring 138.

Whilst the invention has been illustrated and particularly described in conjunction with an obturator and a filling nozzle, it is to be borne in mind that such description and illustration are merely by way of example and that the invention is not to be considered as limited thereto, but only by the appended claims. It is obvious that the invention is susceptible of being utilized wherever a connection between two pipes or two conduits is to be effected or for the connection of a lubricating nozzle to a nipple to be lubricated as well as of many other applications which will be apparent.

I claim:

1. In a device of the class described, an obturator, a nozzle having one end adapted to form a telescopic connection with the obturator, an annular spring positioned on the nozzle and adapted to receive the obturator therein and double wedging means, adapted to first close and then tighten the spring onto the obturator to hold the obturator and nozzle in assembled relation.

2. In a device of the class described, an obturator having a depression in one wall thereof, a nozzle, an annular spring positioned on the nozzle and a jaw member on the nozzle operative to wedge the spring into the depression to fix the obturator and nozzle relatively, said annular spring having a split ring therewithin to preclude deformation thereof during operation of said wedging means.

3. In a device of the class described, an obturator having a depression in one wall thereof, a nozzle, an annular spring positioned on the nozzle, and means within said annular spring to preclude deformation thereof while permitting annular compression of the spring to the extent required for wedging engagement with said depression.

JACQUES MULLER.

REFERENCES CITED

The following references are of record in the file of this patent:

UNITED STATES PATENTS

| Number | Name | Date |
| --- | --- | --- |
| 274,715 | Buckley | Mar. 27, 1873 |
| 477,125 | Johnson et al. | June 14, 1892 |
| 637,505 | Franklin | Nov. 21, 1899 |
| 1,240,170 | Block | Sept. 18, 1917 |
| 1,322,357 | Seng | Nov. 18, 1919 |
| 1,507,015 | Zimmermann | Sept. 2, 1924 |
| 1,529,441 | Leinert | Mar. 10, 1925 |
| 1,754,639 | Meyer | Apr. 15, 1930 |
| 1,770,669 | Martinet | July 15, 1930 |
| 1,796,827 | Butler | Mar. 17, 1931 |
| 1,919,001 | White | July 18, 1933 |
| 2,069,377 | Matthiessen | Feb. 2, 1937 |
| 2,084,431 | Catley | June 22, 1937 |
| 2,111,965 | Baldwin | Mar. 22, 1938 |